March 15, 1960

B. L. BAXTER 2,929,036

ELECTRICAL COIL CONSTRUCTION

Filed July 27, 1956

INVENTOR.
BRUCE L. BAXTER

BY Arthur H. Robert

ATTORNEY

United States Patent Office 2,929,036
Patented Mar. 15, 1960

2,929,036

ELECTRICAL COIL CONSTRUCTION

Bruce L. Baxter, Louisville, Ky., assignor to Reynolds Metals Co., Louisville, Ky., a corporation of Delaware Application July 27, 1956, Serial No. 600,509

3 Claims. (Cl. 336—62)

This invention relates to electrical coils of the type having a winding composed of a strip of strap metal.

It is desirable to cool the coils of an electrical transformer in order to reduce the likelihood of insulation breakdown and improve its operating efficiency. This has been accomplished heretofore by somewhat cumbersome and expensive means.

The principal object of the present invention is to provide a simple, efficient, and relatively inexpensive means of cooling an electrical coil, such as a transformer winding, composed of strap metal.

The objects of the present invention are attained by winding a pressure welded expanded passageway panel, in the form of an elongated anodized strip, to form an electrical coil and by connecting the passageway of the strip to a heat transfer system which operates to flow a coolant through said passageway. In this way, the coil cooling passageways are built into the strip itself.

This invention is illustrated in the accompanying drawing wherein.

Figure 1:
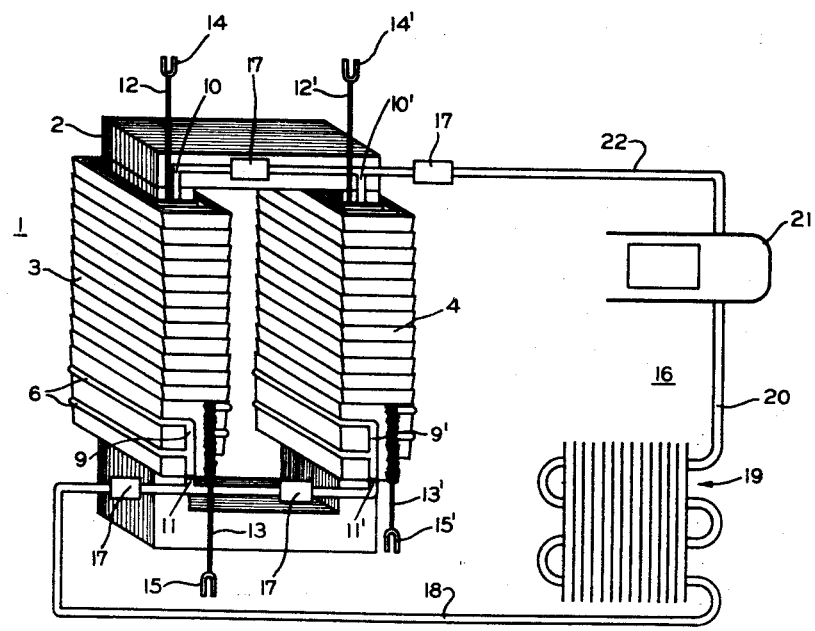
Fig. 1 is a schematic diagram of a transformer and its associated heat transfer system incorporating the novel coil of this invention.

Fig. 1 shows a transformer 1 having a core 2 and high and low voltage windings 3, 4 respectively. The windings 3, 4 may differ in various ways but are here assumed to be similar except for a difference in the number of turns. Furthermore, while I use a transformer to illustrate one application of the invention, it will be understood that the invention may be applied to other products, such for example as a single coil.

Figure 2:
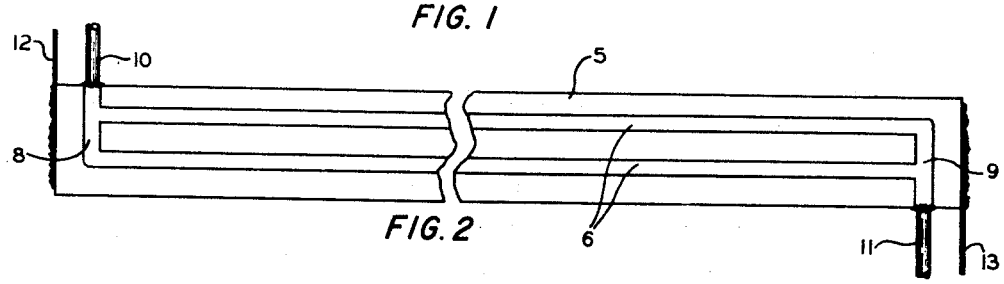
Fig. 2 is a broken away plan view of the elongated metallic strip from which the coil of this invention is formed.
Figure 3:
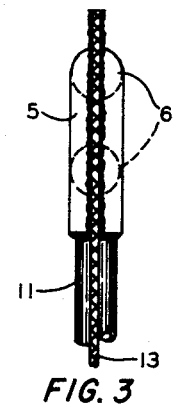
Fig. 3 is an end view of the strip of Fig. 2.

Fig. 2 shows a pressure welded expanded passageway panel in the form of an elongate composite strip 5 of strap metals, such as aluminum, copper etc. Since the Long U.S. Patent No. 2,662,273 discloses a method of making a pressure welded expanded passageway panel, reference is made thereto for information concerning the method of making the strip 5. The strip 5 may be of any desired width and length, these dimensions being determined by the size and design of the coil to be formed from it. It is formed with at least one, and preferably two expanded passageways 6 extending generally in the direction of the length of the strip.

The passageways 6 terminate in expanded headers 8 and 9, one at each end of the strip 5. These headers terminate in edge openings which are respectively provided with inlet and outlet conduits 10, 11 secured by any suitable means such as welding, brazing, or soldering. The conduits 10, 11 may be connected to the strip either before it is wound into a coil or after.

As the strip 5 is to serve as a winding through which an electrical current is to pass, electrical leads 12, 13 are suitably secured to the ends of the strip 5, by any means such as welding, brazing, soldering, etc. The leads 12, 13 may be provided with terminal connectors 14, 15 either before or after the coil winding operation.

In winding each coil upon its leg of the transformer core, the turns may be so positioned, relatively to each other as to place the fluid passageways 6 of successive turns in staggered relationship. This results in a more compact construction.

It is, of course, necessary that some type of insulation be provided around the strip 5 to insulate successive turns from each other. For this reason, the strip may be coated with enamel or wrapped in some other suitable insulation material. Preferably the strip is formed of aluminum and anodized to provide the insulation film.

To cool the coils 3 and 4, their passageways are connected to a heat transfer system 16. This system may be of any desired type. The system shown comprises: insulator fittings 17; heat exchanger 19; and pump 21.

Since the strip itself conducts electricity, it is necessary to insulate the strip, electrically from the heat transfer system. Accordingly, each of the inlet and outlet conduits 10, 10' and 11, 11' of the coils 3 and 4 is provided with a fitting 17 composed of some suitable insulating material such as "Transite" (asbestos), "Bakelite," or some other satisfactory electrically non-conductive material. The fitting 17 enables the passageways of the coils to be connected with the heat transfer system 16 and electrically insulated therefrom so long as the liquid used in the system is itself an insulator such as oil.

The heat exchanger 19 may be of any conventional structure, the structure shown conventionally including a series of fins threaded over a tube which is bent to form several parallel passes.

The pump 21 may be of any suitable character.

In the heat transfer system 16, shown, liquid is discharged from the coils 3 and 4 through terminal conduits 11, 11' and passes successively through pipe 18, heat exchanger 19, pipe 20, pump 21 and pipe 22 back to the conduits 10, 10' of the coils 3 and 4.

Thus, it can be seen that this invention provides a novel electrical coil composed of an elongated, pressure welded, expanded passageway panel, in the form of a strip of composite strap metal, which can be wound into a coil in a simple and inexpensive manner. The passageways of the coiled material permit ready circulation of a cooling liquid in intimate contact with the coil strip for the maximum heat transfer. This cooling system improves the efficiency of the transformer and reduces the danger of insulation breakdown.

I claim:

1. An electrical coil construction comprising: an elongate strip of metal internally containing a longitudinally extending passageway enclosed by passageway walls bulged outwardly on the opposite faces of said strip; said strip being wound in a coil having a plurality of turns, each succeeding turn overlapping the preceding turn in a radial direction and being offset axially relatively thereto, the passageway walls of each succeeding turn being offset from the passageway walls of the preceding turn in the axial direction of said coil; and means electrically insulating said coil turns from each other.

2. The apparatus of claim 1 wherein: said electrical insulation comprises an anodic film on said strip.

3. A transformer having a core and a winding on said core, comprising: a pressure welded expanded passageway panel in the form of an elongated metallic strip having passageways enclosed by passageway walls bulged outwardly on the opposite faces of said strip and being wound on said core in a plurality of radially overlapped and axially offset turns and with the passageway walls of each turn being axially offset from the passageway walls of adjacent turns; and means on said strip electrically insulating each of said turns from adjacent turns.

References Cited in the file of this patent
UNITED STATES PATENTS

| | | |
|---|---|---|
| 999,749 | Chubb | Aug. 8, 1911 |
| 1,789,229 | Gebhard | Jan. 13, 1931 |
| 1,890,773 | Eibl | Dec. 13, 1932 |
| 2,497,516 | Phelps | Feb. 14, 1950 |
| 2,662,273 | Long | Dec. 15, 1953 |

FOREIGN PATENTS

| | | |
|---|---|---|
| 113,180 | Sweden | Feb. 13, 1945 |